(12) United States Patent
Bursztein

(10) Patent No.: US 8,651,319 B2
(45) Date of Patent: Feb. 18, 2014

(54) LID FOR A CONTAINER

(71) Applicant: Formaster S.A., Kielce (PL)

(72) Inventor: Stawomir Bursztein, Kielce (PL)

(73) Assignee: Formaster S.A., Kielce (PL)

( * ) Notice: Subject to any disclaimer, the term of this patent is extended or adjusted under 35 U.S.C. 154(b) by 0 days.

(21) Appl. No.: 13/751,770

(22) Filed: Jan. 28, 2013

(65) Prior Publication Data

US 2013/0193144 A1    Aug. 1, 2013

(30) Foreign Application Priority Data

Jan. 27, 2012 (PL) .......................... 397918

(51) Int. Cl.
   B65D 51/00    (2006.01)
(52) U.S. Cl.
   USPC ........................................ 220/828
(58) Field of Classification Search
   USPC .................... 220/828, 827; 210/239, 146
   See application file for complete search history.

(56) References Cited

U.S. PATENT DOCUMENTS 2,176,395 A    10/1939 Evers

FOREIGN PATENT DOCUMENTS

| EP | 0 992 458 A2 | 9/1999 |
|----|--------------|--------|
| EP | 1 169 954 A1 | 1/2002 |
| EP | 1 727 449 | 12/2006 |
| EP | 2 119 486 A1 | 11/2009 |
| GB | 420185 | 11/1934 |
| GB | 2 328 333 A | 2/1999 |
| PL | 335856 | 4/2000 |
| PL | P-335856 | 4/2000 |
| WO | WO 00/55099 A1 | 9/2000 |
| WO | WO 2005/092155 A1 | 10/2005 |
| WO | WO 2008/058632 A1 | 5/2008 |

OTHER PUBLICATIONS

Search Report issued by the Polish Patent Office in Application No. P-397918, dated Jan. 27, 2012 (2 pgs).

Primary Examiner — Steven A. Reynolds
Assistant Examiner — King M Chu
(74) Attorney, Agent, or Firm — Nixon & Vanderhye

(57) ABSTRACT

Lid for a container for filling the container from above, the opening being closable by a pivotable closure element mounted on an inner side of the lid so as to be rotatable about a first axis (X) which axis is horizontal when the lid is located on top of the container. The closure element includes a first part for closing the top of the container located on one side of the axis (X), and a second part as a counterweight on the other side of the axis (X). A pivotable bias element is rotatably mounted on the inner side of the lid on a second axis (Y) which is parallel to the first axis (X). The bias element is biased onto the second part by gravity and causes the first part to be pressed to the opening.

14 Claims, 4 Drawing Sheets

LID FOR A CONTAINER

This application claims priority to Polish Patent Application No. P-397918 filed 27 Jan. 2012, the entire contents of which is hereby incorporated by reference.

The invention concerns a lid for a container, in particular a liquid container. Such lids are used specifically in the containers forming part of water filtering devices that are filled with tap water through an opening located in the lid.

BACKGROUND OF THE INVENTION

Many types of containers are known having suitable lids. Such lids are removable and they are usually provided with an opening through which tap water can be poured into the container. The opening is often equipped with closure elements of various types, in particular the closure elements enable automatic closing of the opening when the water is not poured down on the lid and they are opened when a stream of water runs on them.

Such lids are described e.g. in the patent applications WO 00/55099 and WO 05/092155 and in the patent EP1727449. According to these solutions, the lid opening is equipped with a closure element mounted on the lid so as to be pivotable about an axis, the closure yielding to a running stream of liquid and opening the inlet, then retreating to its initial closing equilibrium position by means of various mechanisms when the stream stops running.

In the devices according to WO 05/092155 and EP1727449 e.g. a gravity counterweight is used, located on the opposite side of the axis in relation to the closure element. The suitable weight of the counterweight causes it to sink when the closure element, not loaded with the stream of the liquid, goes up. A disadvantage of these devices resides in the monolithic construction of the closure element and its counterweight, both elements constituting one piece. Consequently, use different counterweights, depending e.g. on the size of the opening and hence the type and weight of the closure element, is not possible.

SUMMARY OF THE INVENTION

The aim of the invention is to simplify the production process of the containers having various openings by providing a container lid capable of being equipped with various closure elements, the counterweight being mounted independently and chosen depending on the weight of the closure element of a desired container/lid.

According to the invention a lid for a container is provided, in particular a liquid container, comprising an opening for filling the container with its contents from above, the opening being closable by means of a pivotable closure element mounted on the inner side of the lid so as to be rotatable about a first axis, the first axis being horizontal when the lid is located on top of the container, the closure element comprising a part for closing the top opening of the container, the part being located on one side of the first axis, and a part constituting a counterweight of the part on the other side of the first axis, characterized in that a pivotable bias element is provided between the closure element and the lid, the bias element falling by gravity on the counterweight part and causing that the closing part is being pressed to the opening.

Preferably, the pivotable bias element is mounted on the inner side of the lid, rotatably on a second axis which is parallel to the first axis.

The second axis on which the pivotable bias element is mounted and the first axis on which the pivotable closure element is mounted, are preferably mounted on mutual arms in which the endings of both axes are rotatably fitted, the arms extending from the inner side of the lid.

The pivotable bias element may have a shape of a flap, preferably a rectangular flap.

In another embodiment, the pivotable bias element may have a shape of a frame, preferably a rectangular frame.

In yet another embodiment, the pivotable bias element has a shape of a bar, preferably a bar provided with a ballast ending.

The lid preferably comprises means for registering each deviation of the closure element from its equilibrium.

The registering means preferably cooperate with the counterweight part.

The registering means may be formed by an electronic meter provided with a display which is visible from outside on the lid The lid may have a shape adapted to the contour of the top part of the container and/or may comprise a longitudinal projection to be located above the spout for dispensing the liquid from the container.

Preferably, the opening is rounded or oval and the closing part of the closure element has a shape adapted to the opening.

BRIEF DESCRIPTION OF THE DRAWINGS

An example of embodiment of the invention is illustrated in the following drawing in which.

DETAILED DESCRIPTION OF THE INVENTION

Figure 1A:
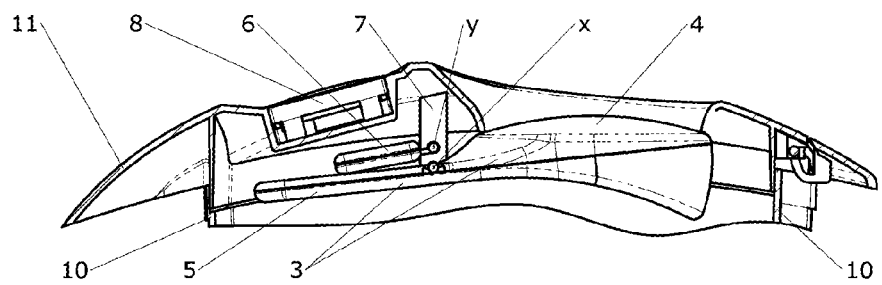
FIG. 1a shows a longitudinal section of the lid with the closure element in its closing position.
Figure 1B:
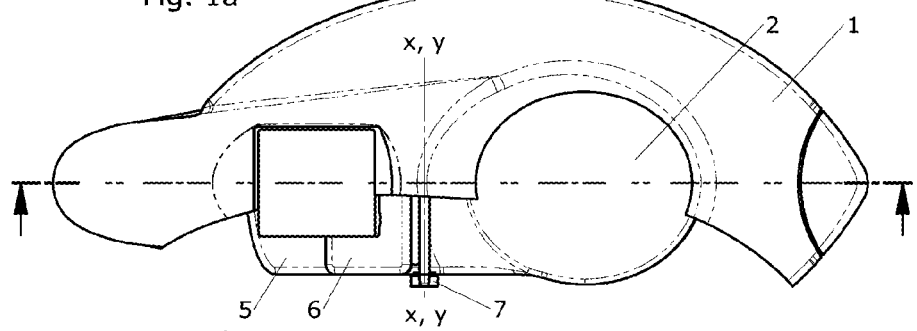
FIG. 1b shows a partial top view of the lid with the closure element in its closing position.
Figure 2A:
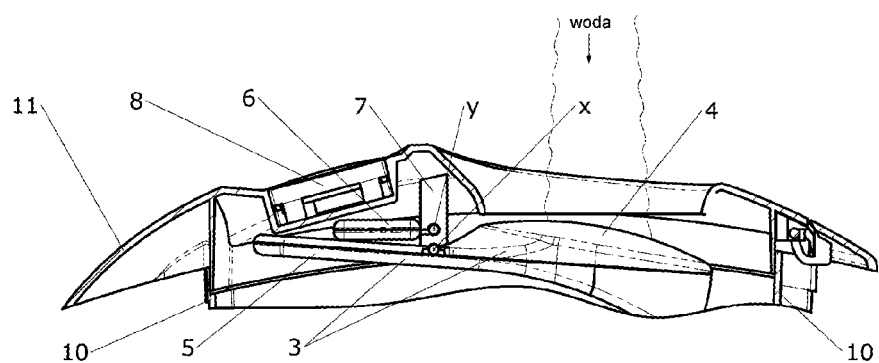
FIG. 2a shows a longitudinal section of the lid with the closure element in its open position, with a stream of liquid, e.g. water, running onto it.
Figure 2B:
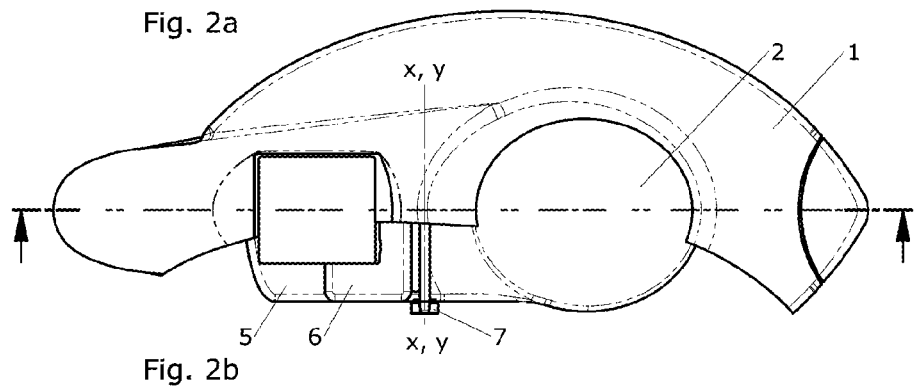
FIG. 2b shows a partial top view of the lid with the closure element in its open position.
Figure 4:
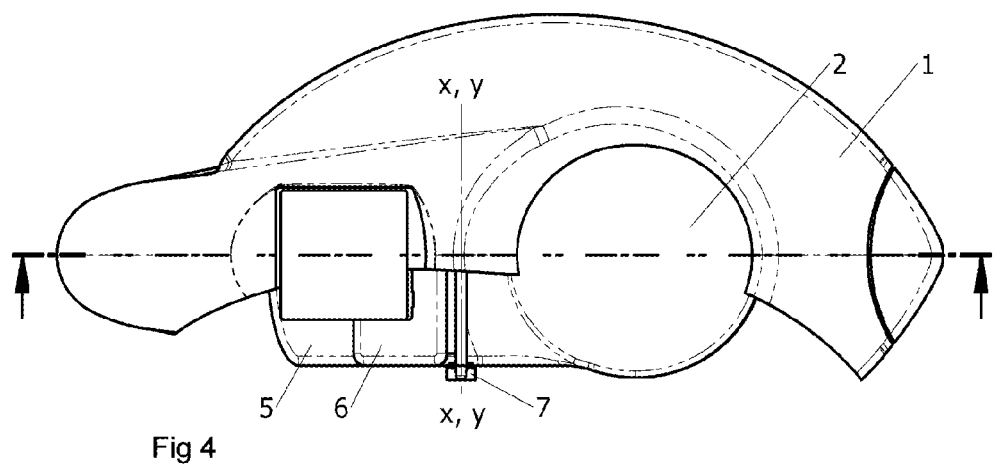
FIG. 4 shows a top view of the lid having a rounded opening.

As may be seen in FIGS. 1b, 2b of the drawing, the exemplary lid 1 according to the invention has a generally oval shape as seen from above, the shape being adapted to the shape of the top rim of the container. The shape of the opening 2 may be oval or be rounded, as shown on FIG. 4. A projection 11 covering a dispensing spout is located on one side of the lid (e.g. as seen along the longer axis of the oval), the oval shape of the lid being lightly sharpened on the opposite side so as to follow the shape of the lid in its handle area.

As shown on FIGS. 1a, 2a the lid is slightly convex. The opening 2 is located in the central part of the lid, and a liquid, usually tap water, may be poured into the container through the opening 2. Specifically, the container having a lid according to the invention may be used as a container of a flow water filtering device. The opening 2 is provided with a pivotable closure element 3, rotatably mounted on an axis X.

The closure element 3 comprises a part 4 for closing the opening of the container, the part 4 being located on one side of the axis X, and a part 5 located on the opposite side of the axis X, constituting a counterweight for the part 4. When no liquid is running into the opening so that no force is being exerted on the closing part 4, the closing part is not loaded and remains in its equilibrium, slightly raised and closing the opening 2 by contacting its edge. On the other side, the counterweight 5 is slightly sunk.

The sinking of the counterweight 5 is caused by the action of the bias element 6 falling on it by gravity. The bias element 6 is balanced so as to softly but efficiently bring the closing part 4 into contact with the edge of the opening 2 when no liquid is falling onto the lid, and to easily pivot in order to open the inlet as soon as a liquid stream appears.

The weight of the bias element 6 must be adapted to the weight or the size of the closing part, which in turn depends on the size of the opening. Considering the above, separate installation of the closing parts and the bias elements is technologically convenient.

Figure 3A:
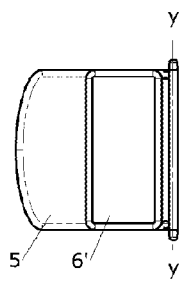
FIGS. 3a, 3b and 3c show variants of shapes of the bias element.
Figure 3B:
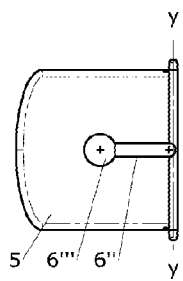
Figure 3C:
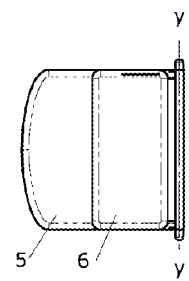

FIGS. 3a, 3b and 3c show the variants of shapes of the bias element that may be a rectangular flap 6 as well as e.g. a rectangular frame 6', or a bar 6", preferably a bar 6" provided with a ballast ending 6'".

As shown in particular in FIGS. 1a and 1b, the pivotable bias element 6 is rotatably mounted to the lid 1 on the axis Y which is parallel to the axis X. In the described example the axis Y on which the pivotable bias element 6 is mounted and the axis Y on which the pivotable closure element is mounted, are mounted on mutual arms 7 in which the endings of both axes are rotatably fitted, the arms extending on the inner side of the lid and both axes being parallel.

Registering means 8, e.g. in the form of an electronic meter, may be located on the lid, e.g. in a special depression. The means 8 may register each deviation of the closure element 3 from its equilibrium. The meter may be associated by any suitable means with e.g. the counterweight part 5. The registering means 8 may be located on the container lid, on its inner or outer side and may be equipped with a display visible from the outside of the lid. Upon suitable adjustment, the registering means may serve as a consumption meter for the water filtering element.

The invention claimed is:

1. Lid for a container having a top, said lid comprising an opening for filling the container from above, the opening being closable by means of a pivotable closure element mounted on an inner side of the lid so as to be rotatable about a first axis (X), the axis (X) being horizontal when the lid is located on the top of the container, the closure element comprising a first part for closing a top opening of the container, the part being located on one side of the axis (X), and a second part constituting a counterweight of the first part located on the other side of the axis (X), a pivotable bias element rotatably mounted on the inner side of the lid on a second axis (Y) which is parallel to the first axis (X), the bias element biasing the second part by gravity and causing the first part to be pressed to the opening.

2. Lid according to claim 1, wherein the second axis (Y) on which the pivotable bias element is mounted and the first axis (X) on which the pivotable closure element is mounted, are mounted on mutual arms in which endings of both axes are rotatably fitted, the arms extending from the inner side of the lid.

3. Lid according to claim 1, wherein the pivotable bias element has a shape of a flap.

4. Lid according to claim 1, wherein the pivotable bias element has a shape of a frame.

5. Lid according to claim 1, wherein the pivotable bias element has a shape of a bar.

6. Lid according to claim 1, comprising registering means for registering each deviation of the closure element from its equilibrium.

7. Lid according to claim 6, wherein the registering means cooperate with the second part.

8. Lid according to claim 6, wherein the registering means are formed by an electronic meter provided with a display which is visible from outside on the lid.

9. Lid according to claim 1, having a shape adapted to the contour of the top of the container and comprising a longitudinal projection for location above a spout for dispensing liquid from the container.

10. Lid according to claim 1, wherein the lid opening is rounded or oval and the first part of the closure element has a shape adapted to the lid opening.

11. Lid according to claim 3, wherein the flap is rectangular in shape.

12. Lid according to claim 4, wherein the frame is rectangular in shape.

13. Lid according to claim 5, wherein the bar is provided with a ballast ending.

14. Lid according to claim 1, wherein the container is a liquid container.

* * * * *